INVENTOR.
Kenneth G. Drucker
BY
Buckhorn, Cheatham & Blore
ATTORNEYS

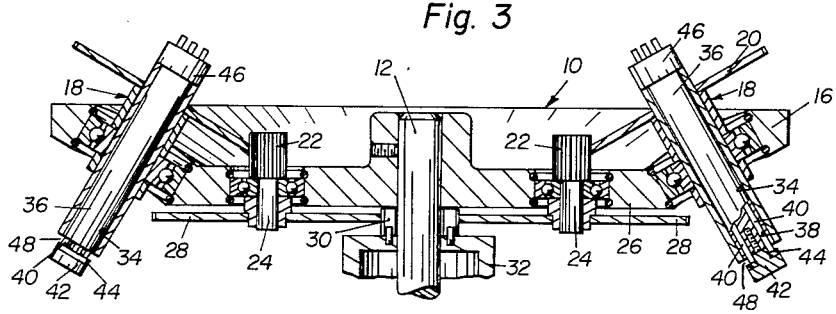
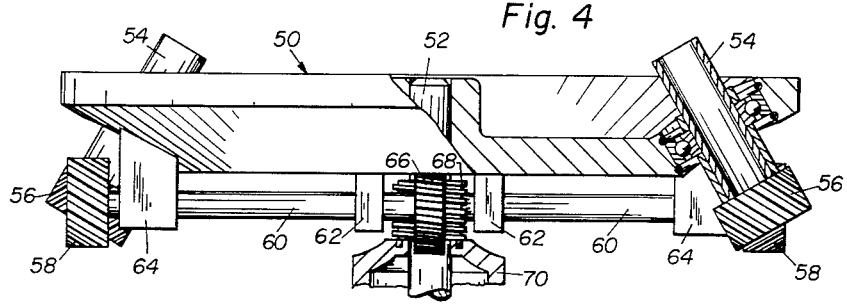
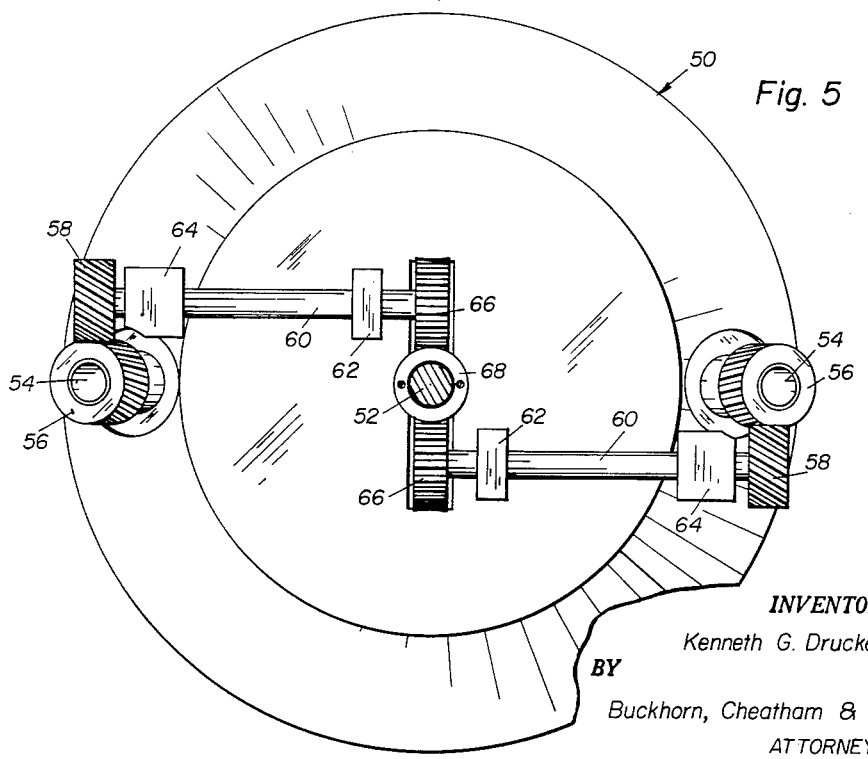

United States Patent Office 3,199,775
Patented Aug. 10, 1965

3,199,775
SEDIMENTATION RATE CENTRIFUGE AND METHOD DETERMINING SEDIMENTATION RATE
Kenneth G. Drucker, P.O. Box 507, Astoria, Oreg.
Continuation of application Ser. No. 135,881, Sept. 5, 1961. This application Nov. 26, 1963, Ser. No. 327,872
13 Claims. (Cl. 233—25)

This application is a continuation of my copending application Serial No. 135,881, filed Sept. 5, 1961, and now abandoned.

This invention relates to a sedimentation rate centrifuge and method of determining sedimentation rate and more particularly to a method which enables the sedimentation rate of solids suspended in a liquid to be accurately and rapidly determined and the centrifuge for carrying out such method. The method and apparatus of the present invention are particularly applicable to the determination of the sedimentation rate of erythrocytes in blood.

The sedimentation rate of the red corpuscles or erythrocytes in blood is a recognized diagnostic procedure and is particularly useful for indicating the presences of infections. The sedimentation rate, in general, increases with the severity of such infections or infectious diseases, although as with most diagnostic procedures there are complicating factors, for example, the sedimentation rate of the erythrocytes in the blood of women which is normally about twice that for men increases during pregnancy.

The present methods of determining the sedimentation rate of erythrocytes is to add a suitable amount of an anticoagulant such as a solution of sodium citrate to a sample of blood withdrawn from a vein of a patient and to then allow the erythrocytes in the resulting mixture to settle in a column of the liquid in a tube of small diameter held in a vertical position. The amount of settling, i.e. the length of column of liquid above the settled erythrocytes after a predetermined time or the time for the erythrocytes to settle a predetermined distance in the column, is taken as a measure of the sedimentation rate. Various sized tubes and various types and amounts of anticoagulants are employed but, in general, a test on a sample of blood requires about an hour settling time. The results vary considerably even on duplicate samples of blood, one reason being that even a slight inclination of the settling tube from the vertical, a condition that is difficult to avoid in actual practice, causes the erythrocytes to settle toward one side of the settling tube and then by a channeling action in the tube, move more rapidly downwardly than would be if the case if the tube were truly vertical and settling were uniform throughout the cross section of the tube. Also a sample of blood of considerable size is required.

There has been a need for a more rapid and more practical method of determining the sedimentation rate of erythrocytes in blood and preferably one which does not require the withdrawing of a rather large sample of blood from a vein and the preparation of such blood with an anticoagulant. Attempts have been made to speed up the settling operation by employing centrifuges to increase the forces causing settling but such attempted methods have also increased the channeling effect above referred to even if settling tubes of very small diameter were employed, and an effort made to keep the axes of the tubes in alignment with the resultant of centrifugal force and gravity. Such centrifuging operations have proved useful in hematocrit tests in which the percentage of red corpuscles or erythrocytes in a sample of blood is desired since substantially complete settling is rapidly obtained, but have not proved useful for erythrocyte sedimentation tests.

In accordance with the present invention, instead of attempting to prevent lateral migration of the erythrocytes and the resultant channeling discussed above by aligning the settling tubes with the resultant of the forces causing settling in a centrifuge, such channeling is prevented by employing a centrifuging operation in which secondary centrifugal forces acting laterally of the settling tubes and rapidly changing in directions with respect to the tube and its contents keep the erythrocytes laterally distributed in the column of material. At the same time, a main centrifugal force causes an increase rate of settling over that which would be obtained by gravity settling. It has been found possible to provide a centrifuge in which the main centrifugal force is produced by rotating a main rotor about a vertical axis with the settling tubes carried in secondary rotors spaced from such vertical axis and with such tubes inclined to the vertical axis of the main rotor so that there is resulting component of centrifugal force on the erythrocytes tending to cause them to settle in the tubes. The repeatedly changes in direction of the lateral forces are produced by also rotating the secondary rotors about secondary axes extending in the direction of the tubes supported therein, but radially spaced from such tubes in order to provide the tubes with a planetary rotation about their secondary axis. These secondary axes are spaced from the main axis at positions adjacent the secondary rotors a distance which is many times the diameters of the tubes. In general, the speed of rotation of the main rotor is several times that of the speed of rotation of the secondary rotors relative to the main rotor but such speeds of rotation are not extremely critical and with a given type of centrifuge results reproducible within experimental error can be easily obtained using commercial motors without elaborate speed regulation apparatus.

It is therefore an object of the invention to provide an improved method of determining the sedimentation rate of solids suspended in a liquid and an improved apparatus for carrying out such method.

Another object of the invention is to provide a method of determining the sedimentation rate of solids suspended in liquid in which centrifugal force is employed to increase the rate at which such solids settle in a column of the liquid and centrifugal forces changing in direction are also employed to keep the solids laterally distributed in such column in order to prevent channeling in the column and too rapid settling of such solids.

Another object of the invention is to provide a method of determining the sedimentation rate of erythrocytes in blood in which a centrifuge is employed to increase the rate of settling of the erythrocytes in a small column of such blood and in which the centrifuge also produces forces having a component extending laterally of such column which repeatedly changes in direction in order to maintain the erythrocytes laterally distributed in such column.

A further object of the invention is to provide a centrifuge for determining the sedimentation of erythrocytes in blood in which a small column of such blood contained in a tube of small diameter is mounted in a secondary rotor carried by a rapidly revolving main rotor and such column is spaced from the axis of the main rotor with such tube held in an inclined position with its top nearer the axis of such main rotor so that centrifugal force causes the erythrocytes to settle at an increased rate and at the same time the secondary rotor is rotated relative to the main rotor to produce forces tending to move said erythrocytes in repeatedly changing directions laterally in such column.

Other objects and advantages of the invention will appear in the following description of the invention made with reference to the attached drawings, of which:

FIG. 3 is a vertical cross section through the rotor structure of FIGS. 1 and 2, taken on the line 3—3 of FIG. 2;

FIG. 4 is a side elevation of a modified rotor structure partly in vertical section;

FIG. 5 is a bottom plan view of the rotor structure of FIG. 4 with portions broken away;

Figure 1:
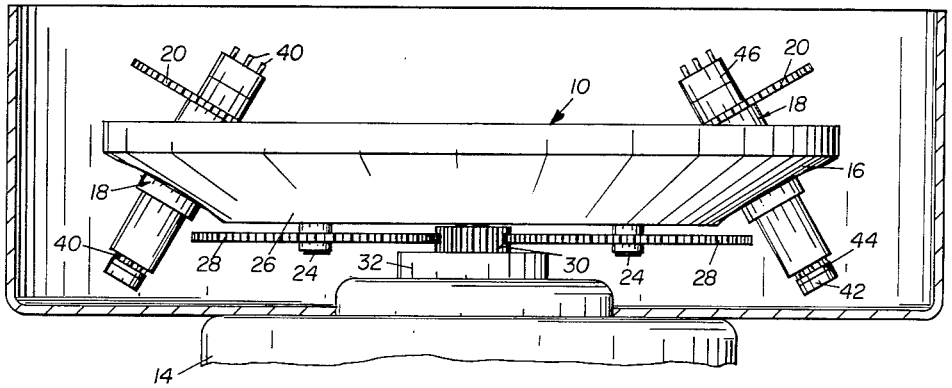
FIG. 1 is a side elevation of the rotor structure of a centrifuge of the present invention with a protective casing around the rotor structure shown in vertical section.
Figure 2:
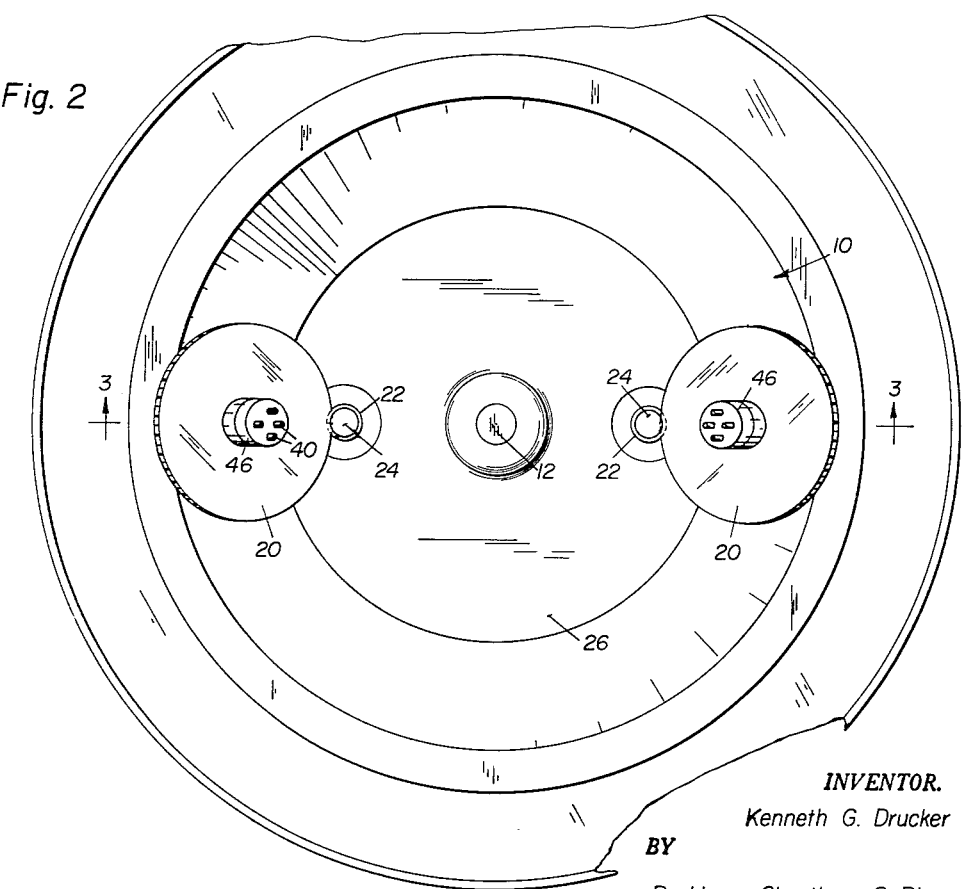
FIG. 2 is a top plan view of the device of FIG. 1 with portions broken away.

Referring more particularly to FIGURES 1 to 3 of the drawings, a centrifuge shown in such figures includes a main rotor 10 secured to the upper end of a vertical shaft 12 of an electric motor 14. The rotor 10 is cup-shaped and has an upwardly inclined outer rim 16. A pair of secondary rotors 18 are journaled in the rim 16 so as to be positioned opposite each other on the main rotor and so as to be inclined to the vertical with the tops of the secondary rotors 18 nearer the axis of the main rotor 10 than the bottoms of such secondary rotors. In the specific example shown, the axes of all of the rotors 10 and 18 are in the same plane and the axis of the secondary rotors 18 are at an angle of 30° to the axis of the main rotor and intersect the axis of the main rotor above the secondary rotors.

The secondary rotors 18 have spur gears 20 surrounding and secured to their upper portions. The gears 20 are concentric with the rotors 18 and mesh with smaller spur gears 22 secured to the upper ends of vertically extending shafts 24 journaled in a horizontally extending web portion 26 of the main rotor 10. The lower ends of the shafts 24 have spur gears 28 secured thereto which mesh with a stationary spur gear 30 secured to the upper surface of an upper housing member 32 of the motor 14. It will be apparent that rotation of the shaft 12 by the motor 14 will rotate the main rotor 10 and that the gears 30, 28, 22 and 20 constitute a speed reducing gear train which will cause rotation of the secondary rotors 18 relative to the main rotor 10. In the specific example shown the gear ratio provided by such gear train may be approximately 1 to 30 with the secondary rotors 18 rotated relative to the main rotor in the same direction as the main rotor 10. In such specific example the main rotor may be rotated, for example, at 1700 r.p.m. so that the secondary rotors are rotated at approximately 57 r.p.m. relative to the main rotor in a rotor structure in which a point in the axes of the secondary rotors 18 midway of the length of such rotors is approximately 3 inches from the axis of the main rotor 10.

The secondary rotors 18 are tubular and each provide an internal bore 34 for receiving a cylindrical sedimentation tube carrier 36 having a plurality of holes 38 extending axially therethrough and spaced radially from the axis of such carrier as shown in FIG. 3. The holes 38 each can receive a small glass sedimentation tube 40 which extend axially of the secondary rotors but are radially spaced from the axis of such rotors as shown in FIG. 2. The carriers 36 are each provided with a support for the lower ends of the tubes 40 in the form of a screw 42 threaded into the lower central portion of such carrier and having an enlarged head with a cushioning washer 44 upon which the lower ends of the sedimentation tubes rest. The upper ends of the carriers 36 are provided with enlarged heads 46 which hold the carriers 36 in position in the secondary rotors 18.

It will be apparent that the carriers 36 can be lifted out of the secondary rotors 18 for removal and replacement and that the sedimentation tubes 40 can be inserted into and removed from the carriers 36 from the top of the carrier. The screw 42 can be removed for cleaning purposes or the removal of a broken tube 40. The screw 42 is shouldered so that a fixed annular gap 48 is left between the lower end of the body portion of the carrier 36 for reception of the cushioning washer 44.

As a specific example, the carriers 36 may be 75 mm. long overall so as to receive sedimentation tubes of the same length with a portion of the upper ends of such tubes projecting from the upper end of the carriers. The carrier may be 11 mm. in diameter and the holes 38 therein may be 2.5 mm. in diameter with their axes spaced 6 mm. from the axis of the secondary rotor. The sedimentation tubes are of glass having an internal diameter of approximately ½ mm. and an outer diameter enabling the tubes to slide easily into the holes 38 so that the walls of the holes 38 support the walls of the tubes 40.

The modification of FIGS. 4 and 5 is similar to the modification of FIGS. 1 to 3 except that worm and helical gears instead of spur gears are employed to drive the secondary rotors. A main rotor 50 is secured to the upper end of a motor shaft 52 and has a pair of secondary rotors 54 journaled therein and inclined similarly to the rotors 18 of FIGS. 1 to 3. Each of the secondary rotors 54 has a helical gear 56 secured concentrically on its lower end. Each gear 56 meshes with a helical gear 58, the helical gears each being secured to an end of a cross shaft 60 journaled in bearings 62 and 64 mounted on the lower surface of the main rotor 50. The other ends of the cross shafts each have worm pinions 66 secured thereto which mesh with a stationary worm gear 68 secured to an upper housing member 70 of an electric motor so as to surround the motor shaft 52. The secondary rotors can receive sedimentation tube carriers, such as the carriers 36 of FIG. 3, and the dimensions and gear ratios may be substantially the same as the centrifuge of FIGS. 1 to 3.

Figure 6:
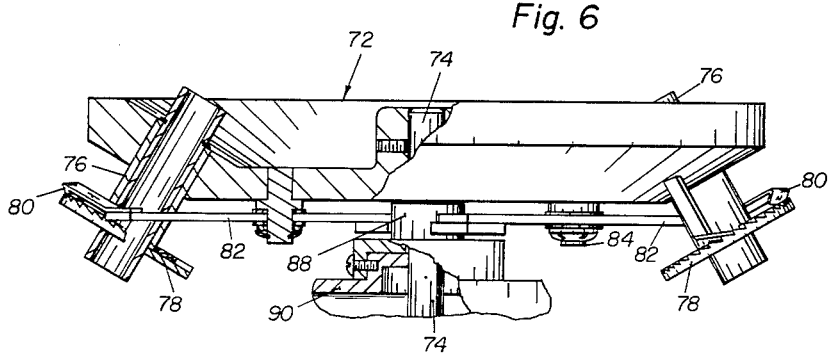
FIG. 6 is a view similar to FIG. 4 showing a further modified rotor structure.
Figure 7:
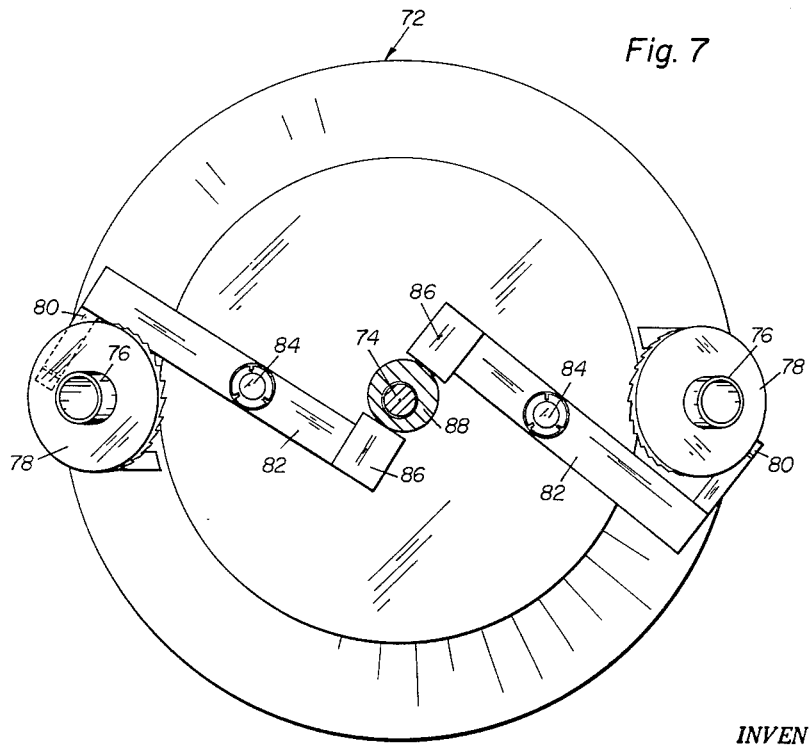
FIG. 7 is a bottom plan view of the rotor structure of FIG. 6.

The modification shown in FIGS. 6 and 7 employs a ratchet mechanism to rotate the secondary rotors instead of gear trains, such as shown in FIGS. 1 to 5, and is included to illustrate that the rotation of the secondary rotors need not be continuous. The centrifuge of FIGS. 6 and 7 includes a main rotor 72 secured to the upper end of a vertically extending motor shaft 74. A pair of secondary rotors 76 are journaled in the main rotor 72 and are inclined in the same manner as the rotors 18 of FIGS. 1 to 3. Each of the rotors 76 has a ratchet wheel 78 secured concentrically thereto near its lower end. A ratchet pawl 80 of spring metal is positioned to engage ratchet teeth on the upper face of each of the ratchet wheels 78. The pawls 80 are each carried on the end of a ratchet member 82 in the form of a lever pivoted intermediate its ends on pivots 84 carried on the lower surface of the main rotor 72. The other ends of the ratchet members 82 carry cam followers 86 which engage a stationary eccentric cam 88 secured to an upper housing member 90 of an electric motor so as to surround the motor shaft 74.

The secondary rotors 76 of FIGS. 6 and 7 may receive sedimentation tube carriers of the same type as the carriers 36 of FIG. 3 and the dimensions of the rotors and carriers may be the same as those of the modification of FIGS. 1 to 3. The throw of the cam 88 and the relative lengths of the lever arms of the ratchet members 82 may also be such as to rotate the secondary rotors 76 at a rate relative to the main rotor 72, similar to that described with reference to FIGS. 1 to 3.

In carrying out the method of the present invention, a drop or less of blood is obtained from the finger or other readily accessible portion of a patient. The amount of blood necessary for a given test is sufficiently small that puncturing a vein to secure such blood is unnecessary. A sedimentation tube of the type above described is filled with the blood thus obtained. A sedimentation tube containing a small amount of anticoagulant may be employed if desired, but if the centrifuging of the blood is promptly done, such anticoagulant is not required. The tube containing the small column of blood mixture is placed in a sedimentation tube carrier, such as the carrier 36 of FIG. 3, and the main rotor of the centrifuge rotated at a suitable speed, for example, the 1700 r.p.m. mentioned above for a centrifuge providing an average radius of 3 inches from the axis of the main rotor to the material being centrifuged. The secondary rotors are rotated at a lesser speed relative to the main rotor, for example, the 57 r.p.m. also mentioned above. Other samples of blood in other sedimentation tubes may, of course, be centrifuged at the same time.

Since the sedimentation tubes are inclined to the axis of the main rotor with their closed ends a greater distance from the axis of the main rotor than their open ends, there is a component of the centrifugal force produced by rotation of the main rotor which is directed axially of the tubes toward their closed ends. This causes movement of the erythrocytes toward the closed ends of such tubes since the erythrocytes are of greater specific gravity than the suspending liquid. There is also a component of such centrifugal force which acts to move the erythrocytes laterally in such tubes and if the tubes are maintained stationary with respect to the main rotor, the erythrocytes will move toward the outside of such tubes and a channeling action rapidly develops during which the erythrocytes all rapidly move toward and collect at the closed end of the tube. The result is a hematocrit test and not a sedimentation test.

By rotating the tubes with the secondary rotors relative to the main rotor in a planetary manner about the secondary axes of such secondary rotors at a lower r.p.m. than that of the main rotor, the column of blood in the tubes is also rotated relative to the main rotor and the lateral forces acting on the erythocytes are repeatedly changed in direction relative to such tube and column so that the erythrocytes remain distributed laterally in the column and the rate of settling of such erythrocytes is a measure of the sedimentation rate. The centrifuge is run for a given time which may be, for example, within the range of one to six minutes, instead of the approximately one hour required by present tests. The centrifuge is then stopped and the sedimentation tubes removed. The amount of settling of the erythrocytes can then be measured and the rate of settling determined therefrom. Accurate and reproducible rapid test results are obtained. The same sample of blood in the same sedimentation tube can thereafter be employed in a hematocrit test by further centrifuging to produce substantially complete settling.

While specific examples of centrifuges and rates of rotation thereof have been given above, the various factors are subject to considerable variation. For example, with centrifuges having the specific dimensions and inclination of the secondary rotors of the specific example discussed above, the speed of the main rotor is not at all critical and may vary between approximately 1500 and 1725 r.p.m. with the results of the tests still remaining within experimental errors caused by other factors. Also the speed of rotation of the secondary rotors with respect to the main rotor is not critical and can be varied, for example, between 20 and 60 r.p.m. with the other conditions remaining as described above. The exact inclination of the secondary rotors is also not critical although approximately a thirty degree inclination has so far given the best results with the other factors the same as those described above. This inclination can, however, be varied between approximately 15 and 45 degrees with suitable modifications of the speed of rotation of the main rotor and of the distance between the secondary rotors and the axis of the main rotor. It will be apparent that such distance can be increased if the speed of the main rotor is decreased and vice versa between considerable limits and that one of these factors can be increased if the inclination of the sedimentation tubes is decreased and vice versa. Also it is apparent that the number of secondary rotors mounted upon the main rotor can vary from one to as many as there is room for on a given main rotor. The method and apparatus is also not limited to blood sedimentation tests but is applicable to determining the sedimentation rate of other solids suspended in liquids. The invention is thus not to be limited to the details specifically described herein.

I claim:
1. A centrifuge comprising:
a main rotor journaled for rotation about a main axis,
a secondary rotor carried by said main rotor and spaced radially from said axis, said secondary rotor being journaled on said main rotor about a secondary axis inclined with respect to said main axis,
means to support on said secondary rotor an elongated container for material to be centrifuged with said container extending axially of said secondary rotor and being spaced radially of said secondary rotor from said secondary axis,
means to rotate said main rotor about said main axis,
and means to rotate said secondary rotor about said secondary axis relative to said main rotor in order to provide said container with planetary rotation about said secondary axis.

2. A sedimentation rate centrifuge comprising:
a main rotor journaled for rotation about a main axis,
a secondary rotor carried by said main rotor and spaced radially from said axis, said secondary rotor being journaled on said main rotor about a secondary axis inclined with respect to said main axis,
means to support in said secondary rotor an elongated container for material to be centrifuged with said container extending axially of said secondary rotor and being spaced radially of said secondary rotor from said secondary axis a distance which is small compared to the radial spacing between said main axis and said secondary rotor,
means to rotate said main rotor about said main axis,
and means to rotate said secondary rotor relative to said main rotor.

3. A sedimentation rate centrifuge comprising:
a main rotor journaled for rotation about a main axis,
a secondary rotor carried by said main rotor and spaced radially from said axis, said secondary rotor being journaled on said main rotor about a secondary axis inclined with respect to said main axis,
means to support on said secondary rotor an elongated container with said container extending axially of said secondary rotor and being spaced from said secondary axis,
means to rotate said main rotor about said main axis,
and means to rotate said secondary rotor about said secondary axis relative to said main rotor at a lesser speed of rotation than said main rotor.

4. A centrifuge comprising:
a main rotor journaled for rotation about a main axis,
a secondary rotor carried by said main rotor and journaled thereon for rotation about a secondary axis eccentrically disposed with respect to said main axis and inclined with respect to said main axis, said secondary rotor having means for receiving and supporting the walls of an elongated container for material to be centrifuged with said container extending axially of said secondary rotor and being radially spaced from said secondary axis,
means to rotate said main rotor about said main axis,
and means to rotate said secondary rotor about said secondary axis.

5. A centrifuge comprising:
a main rotor journaled for rotation about a main vertical axis,
a secondary rotor carried by said main rotor and journaled on said main rotor for rotation about a secondary axis eccentric to said main axis, said secondary axis intersecting said main axis above said secondary rotor, said secondary rotor having a socket means receiving and supporting the wall of an elongated container for material to be centrifuged with said container extending axially of said secondary rotor and being spaced from said secondary axis, said secondary axis at a point adjacent said socket means being spaced from said main rotor a distance which is many times the spacing between said container and said secondary axis,
and means to rotate said main rotor about said main axis and to rotate said secondary rotor relative to said main rotor about said secondary axis at a speed of rotation substantially less than the speed of rotation of said main rotor.

6. A sedimentation rate centrifuge comprising:
a main rotor journaled for rotation about a main vertical axis,
a secondary rotor carried by said main rotor and journaled on said main rotor for rotation about a secondary axis eccentric to said main axis, said secondary axis intersecting said main axis above said secondary rotor at an angle of the order of 30°, said secondary rotor having a socket means receiving and supporting the wall of an elongated container for material to be centrifuged with said container extending axially of said secondary rotor and adjacent but spaced from said secondary axis, said secondary axis at a point adjacent said socket means being spaced from said main rotor a distance which is many times the spacing between said container and said secondary axis,
and means to rotate said main rotor about said main axis and to rotate said secondary rotor relative to said main rotor about said secondary axis at a speed of rotation substantially less than and in the same direction as the speed of rotation of said main rotor.

7. A sedimentation rate centrifuge comprising:
a main rotor journaled for rotation about a main vertical axis,
a plurality of secondary rotors carried by said main rotor and journaled on said main rotor for rotation about secondary axes eccentric to said main axis,
each of said secondary axes intersecting said main axis above said secondary rotors at an acute angle, said secondary rotors each having a plurality of socket means which are each adapted to receive a separate elongated container for material to be centrifuged and to support the wall of said elongated container with each of the containers extending axially of a secondary rotor and adjacent but spaced from the secondary axis of the last mentioned secondary rotor, said secondary axes at points adjacent said socket means being spaced from said main rotor a distance which is many times the spacing between the centers of said socket means and said secondary axes,
and means to rotate said main rotor about said main axis and to rotate said secondary rotors relative to said main rotor about said secondary axes at a speed of rotation substantially less than and in the same direction as the speed of rotation of said main rotor.

8. A sedimentation rate centrifuge for determining the sedimentation rate of a suspension of solids in a liquid in which said solids are of greater specific gravity than said liquid, said centrifuge comprising:
a main rotor journaled for rotation about a main vertical axis,
a secondary rotor carried by said main rotor and journaled for rotation on said main rotor about a secondary axis eccentric to said main axis and inclined to the vertical so as to position the upper end of said secondary rotor closer to said main axis than the lower end of said secondary rotor, said secondary rotor having an elongated receptacle extending longitudinally of and spaced radially from said secondary axis for receiving an elongated container for said liquid and solids and for supporting the walls of said container,
means for rotating said main rotor at a controlled speed about said main axis to cause said solids to settle in said liquid and to thus move toward the lower end of said container due to centrifugal force,
and means to rotate said secondary rotor relative to said main rotor at a controlled speed to cause lateral forces to be repeatedly applied to said solids in changing directions relative to said container for preventing channeling movement of said solids toward said lower end of said container to enable the distance settled by said solids under controlled conditions to be measured when the rotation of the rotors is stopped after a predetermined time.

9. A sedimentation rate centrifuge for determining the sedimentation rate of a suspension of solids in a liquid which solids are of greater specific gravity than said liquid, said centrifuge comprising:
a main rotor journaled for rotation about a main vertical axis,
a secondary rotor carried by said main rotor and journaled for rotation on said main rotor about a secondary axis eccentric to said main axis and inclined to the vertical so as to position the upper end of said secondary rotor closer to said main axis than the lower end of said secondary rotor, said secondary rotor having an elongated receptacle extending longitudinally of and spaced radially from said secondary axis for receiving an elongated container for said liquid and solids and for supporting the walls of said container,
means for rotating said main rotor at a controlled speed about said main axis to cause said solids to settle in said liquid and to thus move toward the lower end of said container due to centrifugal force,
and means to rotate said secondary rotor relative to said main rotor at a controlled speed less than that of said main rotor to cause lateral forces to be repeatedly applied to said solids in changing directions relative to said container for preventing channeling movement of said solids toward said lower end of said container to enable the distance settled by said solids under controlled conditions to be measured when the rotation of the rotors is stopped after a predetermined time.

10. A sedimentation rate centrifuge for determining the sedimentation rate of erythrocytes in blood, said centrifuge comprising:
a main rotor journaled for rotation about a main vertical axis,
a secondary rotor carried by said main rotor and journaled for rotation on said main rotor about a secondary axis eccentric to said main axis and inclined to the vertical so as to position the upper end of said secondary rotor closer to said main axis than the lower end of said secondary rotor, said secondary rotor having an elongated receptacle extending longitudinally of but spaced from said secondary axis for receiving an elongated container for said blood and for supporting the walls of said container,
means for rotating said main rotor at a controlled speed about said main axis to cause said erythrocytes to settle in said blood and to thus move toward the lower end of said container due to centrifugal force,
and means to rotate said secondary rotor relative to said main rotor at a controlled speed to provide said container with planetary rotation about said secondary axis in order to cause lateral forces to be repeatedly applied to said erythrocytes in changing directions relative to said container for preventing channeling movement of said erythrocytes toward said lower end of said container to enable the distance settled by said erythrocytes under controlled conditions to be measured when the rotation of the rotors is stopped after a predetermined time.

11. The method of determining the sedimentation rate of a suspension of solids in a liquid which solids are of greater specific gravity than said liquid, said method comprising:
   rotating an elongated body of said suspension at a controlled speed about a main vertical axis with said body spaced from said axis and extending longitudinally of a secondary axis and inclined to the vertical so that the upper end of said body is closer to said main axis than the lower end of said body to cause said solids to settle in said liquid and move toward the lower end of said body due to centrifugal force,
   rotating said body at a controlled speed with planetary motion about said secondary axis for causing lateral forces to be repeatedly applied to said solids in changing direction relative to said body to prevent channeling movement of said solids toward said lower end of said body,
   and stopping the rotation of said body after a predetermined time to thereby enable the distance said solids settle in said body in predetermined time to be measured.

12. The method of determining the sedimentation rate of erythrocytes in blood, said method comprising:
   rotating an elongated body of said blood at a controlled speed about a main vertical axis with said body spaced from said axis and extending longitudinally of a secondary axis inclined to the vertical so that the upper end of said body is closer to said main axis than the lower end of said body to cause said erythrocytes to settle in said blood and move toward the lower end of said body due to centrifugal force,
   rotating said body in a planetary manner about said secondary axis at a controlled speed less than that of said rotating about said main axis for causing lateral forces to be repeatedly applied to said erythrocytes in changing direction relative to said body to prevent channeling movement of said erythrocytes toward said lower end of said body,
   and stopping the rotation of said body after a predetermined time to thereby enable the distance said erythrocytes settle in said body in predetermined time to be measured.

13. The method of determining the sedimentation rate of erythrocytes in blood, said method comprising:
   rotating an elongated container of liquid containing said blood at a controlled speed about a main vertical axis with said container spaced from said axis and extending longitudinally of a secondary axis inclined to the vertical and intersecting said main axis above said container at an angle of the order of 30° to cause said erythrocytes to settle in said liquid and move toward the lower end of said container due to centrifugal force,
   rotating said container in a planetary manner about said secondary axis at a controlled speed less than said rotating about said main axis for causing lateral forces to be repeatedly applied to said erythrocytes in changing direction relative to said container to prevent channeling movement of said erythrocytes toward said lower end of said container,
   and stopping the rotation of said container after a predetermined time to thereby enable the distance said erythrocytes settle in said container in said predetermined time to be measured.

References Cited by the Examiner

UNITED STATES PATENTS

| | | | |
|---|---|---|---|
| 697,255 | 4/02 | Kaczorowski | 233—25 X |
| 1,011,929 | 12/11 | Ecaubert | 233—25 |
| 1,341,670 | 6/20 | Powell | 22—65 |
| 1,566,770 | 12/25 | Packer | 233—25 X |
| 2,073,330 | 3/37 | Zingg | 74—125 |
| 2,110,308 | 3/38 | Nelson | 233—26 X |
| 2,135,839 | 11/38 | Persons | 233—25 X |
| 2,433,065 | 12/47 | Rubissow | 22—65 |
| 2,740,176 | 4/56 | Duval | 22—65 |
| 2,783,938 | 3/57 | Grela et al. | 233—26 X |
| 2,822,127 | 2/58 | Sinn | 233—25 X |
| 2,908,907 | 10/59 | Danielsson | 233—26 |
| 2,961,703 | 11/60 | Pinotti | 22—65 X |
| 3,009,388 | 11/61 | Polanyi. | |

HARRY B. THORNTON, *Primary Examiner.*